United States Patent
Kawanishi

(10) Patent No.: US 6,859,242 B2
(45) Date of Patent: Feb. 22, 2005

(54) POLARIZING PLATE COMPRISING POLYMER FILM AND POLARIZING MEMBRANE

(75) Inventor: Hiroyuki Kawanishi, Kanagawa (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

(21) Appl. No.: 10/415,041

(22) PCT Filed: Oct. 24, 2001

(86) PCT No.: PCT/JP01/09325

§ 371 (c)(1),
(2), (4) Date: Apr. 24, 2003

(87) PCT Pub. No.: WO02/35263

PCT Pub. Date: May 2, 2002

(65) Prior Publication Data

US 2003/0234898 A1 Dec. 25, 2003

(30) Foreign Application Priority Data

Oct. 24, 2000 (JP) ........................................ 2000-324055

(51) Int. Cl.$^7$ ............................................ G02F 1/1335
(52) U.S. Cl. ........................ 349/96; 349/105; 349/117; 349/119
(58) Field of Search .......................... 349/96, 105, 117, 349/119

(56) References Cited

U.S. PATENT DOCUMENTS

| | | | | |
|---|---|---|---|---|
| 5,059,356 A | * | 10/1991 | Nakamura et al. | 252/585 |
| 5,382,465 A | * | 1/1995 | Misawa et al. | 428/207 |
| 6,565,974 B1 | * | 5/2003 | Uchiyama et al. | 428/412 |

FOREIGN PATENT DOCUMENTS

| | | | |
|---|---|---|---|
| EP | 1045261 A1 | 10/2000 | |
| JP | 2000-111914 A | 4/2000 | |
| JP | 2000-137116 A | 5/2000 | |
| JP | 2000-154261 A | 6/2000 | |
| JP | 2000-275434 A | 10/2000 | |
| JP | 2001-42121 A | 2/2001 | |
| JP | 2001-42123 A | 2/2001 | |
| JP | 2001-91743 A | 4/2001 | |
| JP | 2001-208913 A | 8/2001 | |
| JP | 2001-249223 A | 9/2001 | |
| JP | 2001-253971 A | 9/2001 | |

OTHER PUBLICATIONS

Search Report Issued in International Application No. PCT/JP01/09325, Jan. 29, 2002.

* cited by examiner

*Primary Examiner*—Huyen Ngo
(74) *Attorney, Agent, or Firm*—Burns, Doane, Swecker & Mathis, L.L.P.

(57) ABSTRACT

A polarizing plate comprises a polymer film and a polarizing membrane. The polymer film has a slow axis, and the polarizing membrane has a transmission axis. The polymer film and the polarizing membrane are arranged to orient the slow axis of the polymer film essentially at 45° to the transmission axis of the polarizing membrane. The polarizing membrane has a transmittance of 30 to 50% and a polarizing degree of 90 to 100%. When light having a wavelength of 450 nm is incident on the polarizing membrane, the ratio of the transmittance in a direction parallel to the transmission axis to the transmittance in a direction perpendicular to the transmission axis ($T_{//}(450)/T_{\perp}(450)$) satisfies the following formula (I). When light having a wavelength of 590 nm is incident on the polarizing membrane, the ratio of the transmittance in a direction parallel to the transmission axis to the transmittance in a direction perpendicular to the transmission axis ($T_{//}(590)/T_{\perp}(590)$) satisfies the following formula (II).

$$0.6 \leq T_{//}(450)/T_{\perp}(450) \leq 1.5 \qquad (I)$$

$$0.6 \leq T_{//}(590)/T_{\perp}(590) \leq 1.5 \qquad (II)$$

11 Claims, 1 Drawing Sheet

POLARIZING PLATE COMPRISING POLYMER FILM AND POLARIZING MEMBRANE

FIELD OF THE INVENTION

The present invention relates to a polarizing plate comprising a polymer film and a polarizing membrane. The polymer film has a slow axis, and the polarizing membrane has a transmission axis. The polymer film and the polarizing membrane are arranged to orient the slow axis of the polymer film essentially at an angle of 45° to the transmission axis of the polarizing membrane. The invention also relates to a circularly polarizing plate that gives circularly polarized light in the whole visible wavelength region. The invention further relates to a liquid crystal display of a reflection type comprising a polarizing plate improved in quality of an image.

BACKGROUND OF INVENTION

A λ/4 plate has many uses in relation to an anti-reflection film and a liquid crystal display. The λ/4 plate has been widely and practically used. Though the name implies λ/4, most λ/4 plates give λ/4 at particular wavelengths.

Japanese Patent Provisional Publication Nos. 5(1993)-27118 and 5(1993)-27119 disclose a phase retarder in which a birefringent film giving high retardation and another birefringent film giving low retardation are laminated to arrange their optical axes perpendicularly crossed. If the retardation difference of those films is kept λ/4 in the whole visible wavelength region, the phase-retarder theoretically gives λ/4 in the whole visible wavelength region.

Japanese Patent Provisional Publication No. 10(1998)-68816 discloses a λ/4 plate giving λ/4 in a wide wavelength region. The disclosed λ/4 plate comprises laminated two films made of the same polymer, and one of the films gives λ/4 and the other gives λ/2 at the same wavelength.

Japanese Patent Provisional Publication No. 10(1998)-90521 also describes another wide-ranging λ/4 plate comprising laminated two polymer films.

Japanese Patent Provisional Publication No. 2000-137116 and International Patent WO00/26705 describe another phase-retarder and its application to a circularly polarizing plate and a liquid crystal display. The phase-retarder consists of a single polymer film, and the shorter wavelength it is measured at, the smaller retardation the phase-retarder gives.

SUMMARY OF INVENTION

A liquid crystal display of a reflection type comprising a phase-retarder of a single polymer film gives an image age with a certain contrast, but the level of the contrast is still insufficient. The present inventor has studied the cause of the insufficient contrast, and finally found that the circularly polarizing degree fluctuates in a shorter-wavelength region when incident light passes through the polarizing plate and the λ/4 plate.

It is an object of the present invention to obtain a polarizing plate having excellent optical characters. The polarizing plate comprises a polarizing membrane and a single polymer film excellent in both durability and optical characters. The polymer film is laminated on one side of the membrane so that the slow axis of the film may be oriented at 45° to the transmission axis of the membrane.

It is another object of the invention to correct the fluctuation of polarizing degree in a shorter wavelength region, and thereby to provide a liquid crystal display of reflection type that gives an image of high quality without color fluctuation.

The present invention provides a polarizing plate which comprises a polymer film having a slow axis and a polarizing membrane having a transmission axis, said polymer film and said polarizing membrane being arranged to orient the slow axis of the polymer film essentially at an angle of 45° to the transmission axis of the polarizing membrane, wherein the polarizing membrane has a transmittance of 30 to 50% and a polarizing degree of 90 to 100%, wherein when light having a wavelength of 450 nm is incident on the polarizing membrane, the ratio of the transmittance in a direction parallel to the transmission axis to the transmittance in a direction perpendicular to the transmission axis satisfies the following formula (I), and wherein when light having a wavelength of 590 nm is incident on the polarizing membrane, the ratio of the transmittance in a direction parallel to the transmission axis to the transmittance in a direction perpendicular to the transmission axis satisfies the following formula (II):

$$0.6 \leq T_{//}(450)/T_{\perp}(450) \leq 1.5 \quad (I)$$

$$0.6 \leq T_{//}(590)/T_{\perp}(590) \leq 1.5 \quad (II)$$

in which $T_{//}(450)$ is the transmittance in the direction parallel to the transmission axis when light having a wavelength of 450 nm is incident on the polarizing membrane; $T_{\perp}(450)$ is the transmittance in the directions perpendicular to the transmission axis when light having a wavelength of 450 nm is incident on the polarizing membrane; $T_{//}(590)$ is the transmittance in the direction parallel to the transmission axis when light having a wavelength of 590 nm is incident on the polarizing membrane; $T_{\perp}(590)$ is the transmittance in the direction perpendicular to the transmission axis when light having a wavelength of 590 nm is incident on the polarizing membrane.

The invention also provides a liquid crystal display of reflection type comprising a liquid crystal cell, a polarizing plate provided on one side of the liquid crystal cell, and a reflection board, wherein the polarizing plate comprises a polymer film having a slow axis and a polarizing membrane having a transmission axis, said polymer film being arranged near the side of the liquid crystal cell, and said polymer film and said polarizing membrane being arranged to orient the slow axis of the polymer film essentially at an angle of 45° to the transmission axis of the polarizing membrane, wherein the polarizing membrane has a transmittance of 30 to 50% and a polarizing degree of 90 to 100%, wherein when light having a wavelength of 450 nm is incident on the polarizing membrane, the ratio of the transmittance in a direction parallel to the transmission axis to the transmittance in a direction perpendicular to the transmission axis satisfies the formula (I), and wherein when light having a wavelength of 590 nm is incident on the polarizing membrane, the ratio of the transmittance in a direction parallel to the transmission axis to the transmittance in a direction perpendicular to the transmission axis satisfies the formula (II).

The present invention is particularly effective in the case where the polarizing plate functions as a circularly polarizing plate in which the polymer film serves as a λ/4 plate (preferably, in a wide wavelength region).

The present inventor has improved the polarizing membrane and the polymer film, particularly has made a remarkable improvement on the polymer film (for example, by incorporating a retardation-increasing agent), to correct the fluctuation of polarizing degree in a shorter wavelength region. As a result, a polarizing plate having excellent optical characters in a wide wavelength region is obtained.

A liquid crystal display of reflection type comprising the above polarizing plate gives an image of high quality without color fluctuation since the polarizing plate corrects the fluctuation of polarizing degree in a shorter wavelength region.

DETAILED DESCRIPTION OF INVENTION (Polarizing Plate)

Figure 1:
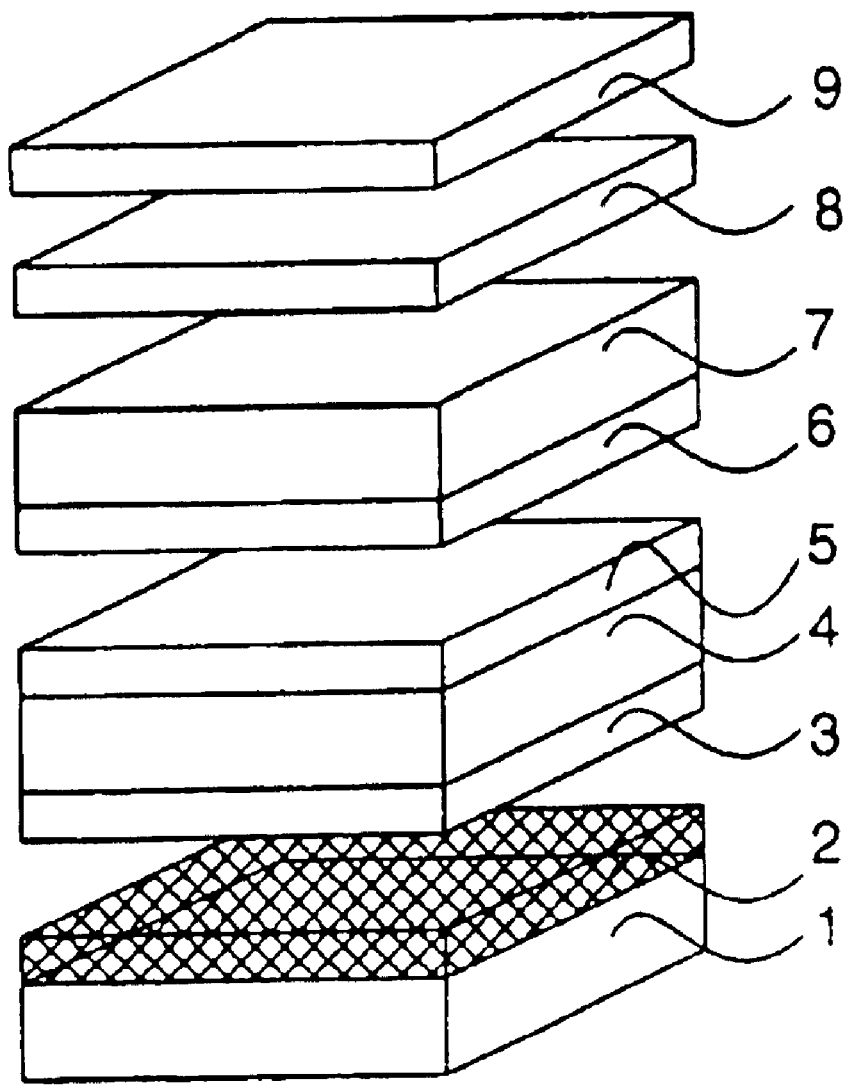
FIG. 1 schematically shows the basic structure of a liquid crystal display of a reflection type.

The polarizing plate of the invention has a basic structure comprising a single polymer film and a single polarizing membrane. A transparent protective film may be provided on the free surface (the surface on which the polymer film is not provided) of the polarizing membrane. As the protective film, the same polymer film as that on the opposite surface or a normal cellulose acetate film may be used.

The polymer film is placed so that the slow axis of the film may be oriented essentially at the angle of 45° to the transmission axis of the membrane. In the present specification, the term "essentially at the angle of 45°" means the angle between the slow axis of the film and the transmission axis of the membrane is in the range of 40° to 50°. The angle is preferably in the range of 41° to 49°, more preferably in the range of 42° to 48°, further preferably in the range of 43° to 47°, and most preferably in-the range of 44° to 46°.

When incident light at 450 nm comes to the polarizing membrane side of the plate, the ratio between the transmittance in the direction parallel to the transmission axis [T//(450)] and that in the direction perpendicular to the transmission axis [T⊥(450)] satisfies the formula (I): $0.6 \leq T//(450)/T\perp(450) \leq 1.5$.

The ratio $T//(450)/T\perp(450)$ preferably satisfies the formula: $0.7 \leq T//(450)/T\perp(450) \leq 1.4$.

Also, when incident light at 590 nm comes to the polarizing membrane side of the plate, the ratio between the transmittance in the direction parallel to the transmission axis [T//(590)] and that in the direction perpendicular to the transmission axis [T⊥(590)] satisfies the formula (II): $0.65 \leq T//(590)/T\perp(590) \leq 1.5$.

The ratio $T//(590)/T\perp(590)$ preferably satisfies the formula: $0.7 \leq T//(590)/T\perp(590) \leq 1.4$.

(Polarizing Membrane)

The polarizing membrane exhibits a transmittance of 30 to 50%. The transmittance is preferably in the range of 35 to 50%, more preferably in the range of 40 to 50%.

The polarizing membrane also exhibits a polarizing degree of 90 to 100%. The polarizing degree is preferably in the range of 95 to 100%, more preferably in the range of 99 to 100%.

Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films. The polarizing axis of the polarizing membrane is perpendicular to the stretching direction.

A commercially available polarizing membrane may be used.

It generally depends on the kind of liquid crystal display where the slow axis of the polymer film and the transmission axis of the polarizing membrane are positioned, and in the liquid crystal display of the invention the slow axis is preferably oriented essentially at the angle of 45° to the transmission axis.

(Polymer Film)

In the case where the polymer film is used as a λ/4 plate, the retardation values measured at 450 nm (Re(450)) and at 590 nm (Re(590)) are preferably in the ranges of 100 to 125 nm and 120 to 160 nm, respectively. The values also preferably satisfy the condition of Re(590)−Re(450)≧2 nm, preferably Re(590)−Re(450)≧5 nm, more preferably Re(590)−Re(450)≧10 nm.

The retardation values measured at 450 nm (Re(450)), at 550 nm (Re(550)) and at 590 nm (Re(590)) are more preferably in the ranges of 108 to 120 nm, 125 to 142 nm and 130 to 152 nm, respectively. Further, the values Re(550) and Re(590) still more preferably satisfy the condition of Re(590)−Re(550)≧2 nm, further preferably Re(590)−Re(550)≧5 nm, most preferably Re(590)−Re(550)≧10 nm. It is also preferred for the values Re(450) and Re(550) to satisfy the condition of Re(550)−Re(450)≧10 nm.

In the case where the polymer film is used as a λ/2 plate, the retardation values measured at 450 nm (Re(450)) and at 590 nm (Re(590)) are preferably in the ranges of 200 to 250 nm and 240 to 320 nm, respectively. The values also preferably satisfy the condition of Re(590)−Re(450)≧4 nm, more preferably Re(590)−Re(450)≧10 nm, most preferably Re(590)−Re(450)≧20 nm.

The retardation values measured at 450 nm (Re(450)), at 550 nm (Re(550)) and at 590 nm (Re(590)) are preferably in the ranges of 216 to 240 nm, 250 to 284 nm and 260 to 304 nm, respectively. Further, the values Re(550) and Re(590) also preferably satisfy the condition of Re(590)−Re(550)≧4 nm, more preferably Re(590)−Re(550)≧10 nm, most preferably Re(590)−Re(550)≧20 nm. It is also preferred for the values Re(450) and Re(550) to satisfy the condition of Re(550)−Re(450)≧20 nm.

The retardation value (Re) is defined by the formula:

$$Re = (nx - ny) \times d$$

in which nx is a refractive index along the slow axis (maximum refractive index) in the plane of the plane of the retarder; ny is a refractive index in the direction perpendicular to the slow axis in the plane of the retarder; and d is the thickness of the retarder in terms of nm.

In addition, the polymer film of the invention is a single film preferably satisfying the condition of:

$$1 \leq (nx - nz)/(nx - ny) \leq 2$$

in which nx is a refractive index along the slow axis in the plane of the retarder, ny is a refractive index in the direction perpendicular to the slow axis in the plane of the retarder, and nz is a refractive index along the thickness of the retarder.

The polymer film is preferably transparent (namely, has a transmittance of 80% or more). Also preferably, the polymer film hardly shows birefringence even if external force is applied. Examples of the polymer film having that character include films of cellulose derivatives (e.g., cellulose esters, cellulose ethers), norbornene-based polymers and vinyl polymers (e.g., polymethyl methacrylate). As the norbornene-based polymers, commercially available polymers (e.g., (e.g., ARTON [trade name] from JSR Corporation and Zeonex [trade name] from Nippon Zeon Co., Ltd.) may be used. In addition, polymers that originally show birefringence when external force is applied (e.g., polycarbonate, polysulfone) can be used if they are modified so as not to show the birefringence (in the manner described in WO00/26705).

As the polymer for the film, cellulose derivatives are preferred. Cellulose esters are more preferred, and cellulose esters of lower fatty acids are further preferred as the polymers. The term "lower fatty acids" means fatty acids having 6 or less carbon atoms. The number of carbon atoms is preferably 2 (cellulose acetate), 3 (cellulose propionate) or 4 (cellulose butyrate). Cellulose esters of mixed fatty acids such as cellulose acetate propionate and cellulose acetate butyrate are also usable.

Cellulose acetate is most preferred. The acetic acid content of cellulose acetate is preferably in the range of 57.0 to 61.5%. The term "acetic acid content" means the amount of combined acetic acid per one unit weight of cellulose. The acetic acid content is determined according to ASTM: D-817-91 (tests of cellulose acetate).

The cellulose acetate has a viscosity average polymerization degree (DP) of preferably 250 or more, more preferably 290 or more. Further, it is also preferred for the cellulose acetate to have a narrow molecular weight distribution of Mw/Mn (Mw and Mn are weight and number average molecular weights, respectively) determined by gel permeation chromatography. The value of Mw/Mn is preferably in the range of 1.00 to 1.70, more preferably in the range of 1.30 to 1.65, most preferably in the range of 1.40 to 1.60.

In order to control the retardation, external force is generally given to the polymer film (for example, the film is stretched). Besides that, an aromatic compound having at least two aromatic rings (described in European Patent No. 0911656A2) can be used as a retardation-increasing agent.

The aromatic compound is incorporated preferably in an amount of 0.01 to 20 weight parts, more preferably in an amount of 0.05 to 15 weight parts, most preferably in an amount of 0.1 to 10 weight parts based on 100 weight parts of the polymer. Two or more aromatic compounds may be used in combination.

The term "an aromatic ring" means not only an aromatic hydrocarbon ring but also an aromatic heterocyclic ring.

As the aromatic hydrocarbon ring, a six-membered ring (namely, a benzene ring) is particularly preferred.

The aromatic heterocyclic ring is generally unsaturated. The aromatic heterocyclic ring is preferably a five-, six- or seven-membered ring, and more preferably a five- or six-membered ring. The aromatic heterocyclic ring generally has double bonds as many as possible. The hetero atom in the ring preferably is nitrogen atom, sulfur atom or oxygen atom, and more preferably is nitrogen atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring.

Preferred aromatic rings are benzene ring, furan ring, thiophene ring, pyrrole ring, oxazole ring, thiazole ring, imidazole ring, triazole ring, pyridine ring, pyrimidine ring, pyrazine ring and 1,3,5-triazine ring.

The number of aromatic rings in the aromatic compound is preferably in the range of 2 to 20, more preferably in the range of 2 to 12, further preferably in the range of 2 to 8, and most preferably in the range of 3 to 6. It is preferred to contain at least one 1,3,5-triazine ring as the aromatic ring.

The relation of the two or more aromatic rings is categorized into three cases, namely (a) the case in which the aromatic rings form a condensed ring,
(b) the case in which the aromatic rings are connected through a single bond, and
(c) the case in which the aromatic rings are connected through a linking group. [In this case, a spiro-bonding is not formed because the rings are aromatic.]

The relation of the aromatic rings may be any of the cases (a) to (c).

Examples of the condensed ring in the case (a) include indene ring, naphthalene ring, azulene ring, fluorene ring, phenanthrene ring, anthracene ring, acenaphthylene ring, naphthacene ring, pyrene ring, indole ring, isoindole ring, benzofuran ring, benzothiophene ring, indolizine ring, benzoxazole ring, benzothiazole ring, benzimidazole ring, benztriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxthine ring, phenoxazine ring and thianthrene ring. Preferred are naphthalene ring, azulene ring, indole ring, benzoxazole ring, benzothiazole ring, benzimidazole ring, benztriazole ring and quinoline ring.

The single bond in the case (b) is preferably between carbon atoms of the two aromatic rings. Two or more single bonds may connect the two aromatic rings to form an aliphatic ring or a non-aromatic ring between them.

The linking group in the case (c) is also preferably between carbon atoms of the two aromatic rings. The linking group is preferably an alkylene group, an alkenylene group, an alkynylene group, —CO—, —O—, —NH—, —S— and a combination thereof.

Examples of the linking group formed by the combination are shown below. In each of the following examples, the right and left terminals may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group may have substituent groups.

Examples of the substituent group include halogen atoms (F, Cl, Br, I), hydroxyl, carboxyl, cyano, amino, nitro, sulfo, carbamoyl, sulfamoyl, ureido, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfoneamide group, an aliphatic substituted amine group, an aliphatic substituted carbamoyl group, an aliphatic substituted sulfamoyl group, an aliphatic substituted ureido group and a non-aromatic heterocyclic group.

The alkyl group preferably has 1 to 8 carbon atoms. A chain alkyl group is preferred to a cyclic one, and a straight chain alkyl group is particularly preferred. The alkyl group may further have a substituent group (e.g., hydroxyl, carboxyl, an alkoxy group, an alkyl-substituted amino group). Examples of the (substituted) alkyl group include methyl, ethyl, n-butyl, n-hexyl, 2-hydroxyethyl, 4-carboxybutyl, 2-methoxyethyl and 2-diethylaminoethyl.

The alkenyl group preferably has 2 to 8 carbon atoms. A chain alkenyl group is preferred to a cyclic one, and a straight chain alkenyl group is particularly preferred. The alkenyl group may further have a substituent group. Examples of the alkenyl group include vinyl, allyl and 1-hexenyl.

The alkynyl group preferably has 2 to 8 carbon atoms. A chain alkynyl group is preferred to a cyclic one, and a straight chain alkynyl group is particularly preferred. The alkynyl group may further have a substituent group. Examples of the alkynyl group include ethynyl, 1-butynyl and 1-hexynyl.

The aliphatic acyl group preferably has 1 to 10 carbon atoms. Examples of the aliphatic acyl group include acetyl, propanoyl and butanoyl.

The aliphatic acyloxy group preferably has 1 to 10 carbon atoms. Examples of the aliphatic acyloxy group include acetoxy.

The alkoxy group preferably has 1 to 8 carbon atoms. The alkoxy group may further have a substituent group (e.g., another alkoxy group). Examples of the (substituted) alkoxy group include methoxy, ethoxy, butoxy and methoxyethoxy.

The alkoxycarbonyl group preferably has 2 to 10 carbon atoms. Examples of the alkoxycarbonyl group include methoxycarbonyl and ethoxycarbonyl.

The alkoxycarbonylamino group preferably has 2 to 10 carbon atoms. Examples of the alkoxycarbonylamino group include methoxycarbonylamino and ethoxycarbonylamino.

The alkylthio group preferably has 1 to 12 carbon atoms. Examples of the alkylthio group include methylthio, ethylthio and octylthio.

The alkylsulfonyl group preferably has 1 to 8 carbon atoms. Examples of the alkylsulfonyl group include methanesulfonyl and ethanesulfonyl.

The aliphatic amide group preferably has 1 to 10 carbon atoms. Examples of the aliphatic amide group include acetoamide.

The aliphatic sulfoneamide group preferably has 1 to 8 carbon atoms. Examples of the aliphatic sulfoneamide group include methanesulfoneamide, butanesulfoneamide and n-octanesulfoneamide.

The aliphatic substituted amine group preferably has 1 to 10 carbon atoms. Examples of the aliphatic substituted amine group include dimethylamino, diethylamino and 2-carboxyethyl amino.

The aliphatic substituted carbamoyl group preferably has 2 to 10 carbon atoms. Examples of the aliphatic substituted carbamoyl group include methylcarbamoyl and diethylcarbamoyl.

The aliphatic substituted sulfamoyl group preferably has 1 to 8 carbon atoms. Examples of the aliphatic substituted sulfamoyl group include methylsulfamoyl and diethylsulfamoyl.

The aliphatic substituted ureido group preferably has 2 to 10 carbon atoms. Examples of the aliphatic substituted ureido group include methylureido.

Examples of the non-aromatic heterocyclic group include piperidino and morpholino.

The retardation-increasing agent has a molecular weight of 300 to 800.

Concrete examples of the retardation-increasing agent are described in Japanese Patent Provisional Publication Nos. 2000-111914, 2000-275434, 2001-166144 and WO00/65384.

The polymer film is preferably prepared according to solvent cast method. In the solvent cast method, a solution (dope) in which the polymer is dissolved in an organic solvent is used.

The process for producing the polymer film is explained below. By way of illustration, the polymer material in the following process is cellulose acetate.

The organic solvent preferably contains a solvent selected from the group consisting of an ether having 3 to 12 carbon atoms, a ketone having 3 to 12 carbon atoms, an ester having 3 to 12 carbon atoms and a halogenated hydrocarbon having 1 to 6 carbon atoms.

The ether, the ketone or the ester may have a cyclic structure. A compound having two or more functional groups of ether, ketone or ester (—O—, —CO— or —COO—) is also usable as the solvent. The organic solvent may have other functional groups such as alcoholic hydroxyl. If the solvent is the compound having two or more functional groups, the number of carbon atoms is in any of the above ranges.

Examples of the ether having 3 to 12 carbon atoms include diisopropyl ether, dimethoxymethane, 1,4-dioxane, 1,3-dioxolane, tetrahydrofuran, anisole and phenetol.

Examples of the ketone having 3 to 12 carbon atom include acetone, methyl ethyl ketone, diethyl ketone, diisobutyl ketone, cyclohexanone and methylcyclohexanone.

Examples of the ester having 3 to 12 carbon atoms include ethyl formate, propyl formate, pentyl formate, methyl acetate, ethyl acetate, and pentyl acetate.

Examples of the compounds having two or more functional groups include 2-ethoxyethyl acetate, 2-methoxyethanol and 2-butoxyethanol.

The halogenated hydrocarbon has preferably one or two carbon atoms, more preferably only one carbon atom. The halogen atom of the halogenated hydrocarbon is preferably chlorine. The ratio of hydrogen substituted with halogen is preferably in the range of 25 to 75 mol. %, more preferably in the range of 30 to 70 mol. %, further preferably in the range of 35 to 65 mol. %, and most preferably in the range of 40 to 60 mol. %. Methylene chloride is a representative halogenated hydrocarbon.

Two or more organic solvents can be used in combination.

The cellulose acetate solution (dope) can be prepared according to an ordinary method. The ordinary method means that the solution is prepared at a temperature of not lower than 0° C. (room temperature or elevated temperature). The solution (dope) can be prepared through a common process by means of a common apparatus in the normal solvent cast method. In the normal process, a halogenated hydrocarbon (particularly, methylene chloride) is preferably used as the solvent.

The amount of cellulose acetate in the solution is preferably in the range of 10 to 40 wt. %, more preferably in the range of 10 to 30 wt. %. To the organic (main) solvent, additives described below may be optionally added.

The cellulose acetate and the organic solvent are mixed and stirred at room temperature (0 to 40° C.) to prepare the solution. For preparing the concentrated solution, the preparation may be carried out at an elevated temperature under a high pressure. In that case, the cellulose acetate and the organic solvent are placed in a vessel resisting pressure. After the vessel is sealed, the mixture is stirred under an increased pressure at an elevated temperature. The temperature is controlled so that it may be higher than the boiling point of the solvent at atmospheric pressure but so that the solvent may not boil. The temperature is normally in the range of 40° C. or more, preferably in the range of 60 to 200° C., more preferably in the range of 80 to 110° C.

The components can be preliminary dispersed coarsely, and the coarse dispersion can be placed in the vessel. Otherwise, the components can also be introduced into the vessel in series. The vessel should be equipped with a stirring device. A pressure in the vessel can be formed by introducing an inert gas such as nitrogen gas into the vessel, or by heating and evaporating the solvent to increase the vapor pressure. Further, the components can be added to the vessel at a high pressure after the vessel is sealed.

The vessel is preferably heated from outside. For example, a jacket heater is preferably used. Otherwise, liquid heated with a plate-heater placed outside of the vessel may be circulated through a pipe wound around the vessel, to heat the whole vessel.

The mixture is preferably stirred with a propeller mixer provided in the vessel. The wing of the propeller preferably has a length reaching the inside wall of the vessel. Further, at the tip of the wing, a scratching mean is preferably provided to scratch and renew liquid attached on the inside wall.

In the vessel, various meters such as pressure gauge and thermometer may be provided. After the components are dissolved in the solvent in the vessel, the prepared dope may be cooled and then taken out of the vessel, or may be taken out and then cooled with a heat exchanger.

The solution (dope) can be prepared according to the cooling dissolution method. If so, cellulose acetate can be dissolved in a solvent in which cellulose acetate is scarcely dissolved by the ordinary method. Even in a solvent in which cellulose acetate can be dissolved by the ordinary method, cellulose acetate can be homogeneously and rapidly dissolved by the cooling dissolution method.

At the first stage of the cooling dissolution method, cellulose acetate is gradually added to the organic solvent and stirred at room temperature. The amount of cellulose acetate in the mixture is preferably in the range of 10 to 40 wt. %, more preferably in the range of 10 to 30 wt. %. Various additives described below may be added in the mixture.

The prepared mixture is then cooled to a temperature of −100 to −10° C., preferably −80 to −10° C., more preferably −50 to −20° C., most preferably −50 to −30° C. The cooling procedure can be carried out, for example, with dry ice-methanol bath (−75° C.) or with cooled ethylene glycol solution (−30 to −20° C.). Through the cooling procedure, the mixture is solidified.

The cooling rate is preferably 4° C./minute or more, more preferably 8° C./minute or more, and most preferably 12° C./minute or more. The cooling rate is preferably as fast as possible. However, a theoretical upper limit of the cooling rate is 10,000° C./second, a technical upper limit is 1,000° C./second, and a practical upper limit is 100° C./second. The cooling rate means the change of temperature at the cooling step per the time taken to complete the cooling step. The change of temperature means the difference between the temperature at which the cooling step is started and the temperature at which the cooling step is completed.

The cooled mixture is then warmed to a temperature of 0 to 200° C., preferably 0 to 150° C., more preferably 0 to 120° C., most preferably 0 to 50° C. Through the warming procedure, the polymer is dissolved in the organic solvent. For warming, the mixture may be left at room temperature or may be heated in a warm bath.

The warming rate is 4° C./minute or more, more preferably 8° C./minute or more, and most preferably 12° C./minute or more. The warming rate is preferably as fast as possible. However, a theoretical upper limit of the cooling rate is 10,000° C./second, a technical upper limit is 1,000° C./second, and a practical upper limit is 100° C./second. The warming rate means the change of temperature at the warming step per the time taken to complete the warming step. The change of temperature means the difference between the temperature at which the warming step is started and the temperature at which the warming step is completed.

Thus, a homogeneous solution can be prepared. If the polymer is not sufficiently dissolved, the cooling and warming procedures may be repeated. It can be judged by observation with the eyes whether the polymer is sufficiently dissolved or not.

In the process of cooling dissolution method, a sealed vessel is preferably used to prevent contamination of water, which may be caused by dew condensation at the cooling step. Further, the mixture may be cooled under a reduced pressure so that the time taken to complete the cooling step can be shortened, and hence a vessel resisting pressure is preferably used to conduct the procedures under a reduced pressure.

According to differential scanning calorimetric measurement (DSC), a 20 wt. % solution prepared by dissolving cellulose acetate (acetic acid content: 60.9%, viscosity average polymerization degree: 299) in methyl acetate through the cooling dissolution process has a pseudo-phase transition point between gel and sol at approx. 33° C. Below that temperature, the solution is in the form of homogeneous gel. The solution, therefore, must be kept at a temperature above the pseudo-phase transition point, preferably at a temperature higher than the pseudo-phase transition point by approx. 10° C. The pseudo-phase transition point depends upon various conditions such as the organic solvent, the acetic acid content, the viscosity average polymerization degree and the concentration of cellulose acetate.

The polymer film is formed from the prepared cellulose acetate solution (dope) according to the solvent cast method.

The dope is cast on a drum or a band, and the solvent is evaporated to form a film. The solid content of the dope before casting is preferably controlled in the range of 18 to 35%. The surface of the drum or band is preferably beforehand polished to be a mirror. The casting and drying steps of the solvent cast method are described in U.S. Pat. Nos. 2,336,310, 2,367,603, 2,492,078, 2,492,977, 2,492,978, 2,607,704, 2,739,069, 2,739,070, British Patent Nos. 640, 731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The surface temperature of the drum or band is preferably 10° C. or below. After cast on the drum or band, the dope is blown with air for 2 seconds or more to dry. The formed film is then peeled, and blown with hot air whose temperature is successively changed from 100° C. to 160° C. in order to evaporate remaining solvent. This procedure is described in Japanese Patent Publication No. 5(1993)-17844. The procedure can shorten the time taken to complete the steps of cooling to peeling. For performing the procedure, the cast dope must gel at the surface temperature of the drum or band.

A plasticizer can be added into the dope to enhance mechanical strength of the resultant film or to shorten the time for drying. The plasticizer is, for example, a phosphate ester or a carbonate ester. Examples of the phosphate ester used as the plasticizer include triphenyl phosphate (TPP) and tricresyl phosphate (TCP). Typical examples of the carbonate ester are phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrate esters include triethyl o-acetylcitrate (OACTE) and tributyl o-acetylcitrate (OACTB). Besides the above, butyl oleate, methylacetyl ricinolate, dibutyl sebacate and various trimellitic esters are also usable. The plasticizers of phosphate esters (DMP, DEP, DBP, DOP, DPP, DEHP) are preferred. Particularly preferred are DEP and DPP.

The content of the plasticizer is preferably in the range of 0.1 to 25 wt. %, more preferably in the range of 1 to 20 wt. %, most preferably in the range of 3 to 15 wt. % based on the amount of the polymer.

Further, a deterioration inhibitor (e.g., oxidation inhibitor, peroxide decomposer, radical inhibitor, metal inactivating agent, oxygen scavenger, amine) may be incorporated in the polymer film. The deterioration inhibitor is described in Japanese Patent Provisional Publication Nos. 3(1991)-199201, 5(1993)-1907073, 5(1993)-194789, 5(1993)-271471 and 6(1994)-107854. The content of the deterioration inhibitor is preferably in the range of 0.01 to 1 wt. %, more preferably in the range of 0.01 to 0.2 wt. % based on the amount of the dope. If the content is less than 0.01 wt. %, the deterioration inhibitor gives little effect. If the content is more than 1 wt. %, the inhibitor often oozes out (bleeds out) to appear on the surface of the film. Particularly preferred deterioration inhibitors are butylated hydroxytoluene (BHT) and tribenzylamine (TBA).

The polymer film can be stretched to control the retardation. The stretching (extension) ratio is preferably in the range of 3 to 100%.

The thickness of the polymer film is preferably in the range of 10 to 70 $\mu$m, more preferably in the range of 20 to 60 $\mu$m, most preferably in the range of 30 to 50 $\mu$m.

The polymer film exhibits a birefringence at 550 nm preferably in the range of 0.00196 to 0.01375, more preferably in the range of 0.00168 to 0.06875, most preferably in the range of 0.00275 to 0.0458.

The polymer film is preferably subjected to a surface treatment. Examples of the surface treatment include corona discharge treatment, glow discharge treatment, flame treatment, acid treatment, alkali treatment, and ultraviolet (UV) treatment.

For keeping the film flat, the temperature of the polymer film is preferably kept below the glass transition temperature (Tg) of the polymer during the surface treatment.

In consideration of adhesion between the polymer film and the polarizing membrane, acid treatment or alkali treatment is preferred. If the polymer film is made of cellulose acetate, the acid or alkali treatment functions as a saponification treatment to the cellulose acetate.

Alkali saponification treatment is particularly preferred. As the alkali treatment, the steps of immersing the film surface in an alkaline solution, neutralizing with an acidic solution, washing with water, and drying are preferably circularly carried out.

Examples of the alkaline solution include aqueous solutions of KOH and NaOH. The normality of hydroxyl ion is preferably in the range of 0.1 to 3.0 N, more preferably in the range of 0.5 to 2.0 N. The temperature of the solution is preferably in the range of room temperature to 90° C., more preferably in the range of 40 to 70° C.

On the polymer film, an undercoating layer (adhesive layer) may be provided. The thickness of the undercoating layer is preferably in the range of 0.1 to 2 $\mu$m, more preferably in the range of 0.2 to 1 $\mu$m.

(Liquid Crystal Display of Reflection Type)

The polarizing plate of the invention is advantageously used in a liquid crystal display, particularly in a liquid crystal display of reflection type.

FIG. 1 schematically shows the basic structure of a liquid crystal display of reflection type.

The display shown in FIG. 1 comprises a lower substrate (1), a reflective electrode (2), a lower orientation layer (3), a liquid crystal layer (4), an upper orientation layer (5), a transparent electrode (6), an upper substrate (7), a $\lambda/4$ plate (8) and a polarizing membrane (9) in this order.

A combination of the lower substrate (1) and the reflective electrode (2) constitutes a reflection board. A combination of the lower orientation layer (3) to the upper orientation layer (5) constitutes a liquid crystal cell. The $\lambda/4$ plate (8) may be placed at any position between the reflection board and the polarizing membrane (9).

For displaying a color image, a color filter layer is additionally provided. The color filter is preferably placed between the reflective electrode (2) and the lower orientation layer (3), or between the upper orientation layer (5) and the transparent electrode (6).

In place of the reflective electrode (2) in FIG. 1, a transparent electrode may be used in combination with a reflection board. The reflection board is preferably a metal board. If the reflection board has a smooth surface, rays parallel to the normal of the surface are often predominantly reflected to give a small viewing angle. Therefore, the surface of the reflection board may be made rugged (as described in Japanese Patent No. 275,620). Otherwise, a light-diffusing film may be provided on one surface (cell side or air side) of the polarizing membrane.

The liquid crystal cell is preferably TN (twisted nematic) mode, STN (supper twisted nematic) mode, or HAN (hybrid aligned nematic) mode.

The liquid crystal cell of TN mode has a twist angle preferably in the range of 40 to 100°, more preferably in the range of 50 to 90°, most preferably in the range of 60 to 800. The product ($\Delta n \cdot d$) of refractive anisotropy ($\Delta n$) and thickness (d) of the liquid crystal layer is preferably in the range of 0.1 to 0.5 $\mu$m, more preferably in the range of 0.2 to 0.4 $\mu$m.

The liquid crystal cell of STN mode has a twist angle preferably in the range of 180 to 360°, more preferably in the range of 220 to 270°. The product ($\Delta n \cdot d$) of refractive anisotropy ($\Delta n$) and thickness (d) of the liquid crystal layer is preferably in the range of 0.3 to 1.2 $\mu$m, more preferably in the range of 0.5 to 1.0 $\mu$m.

In the liquid crystal cell of HAN mode, it is preferred that liquid crystal molecules be essentially vertically aligned on one substrate and that the pre-tilt angle on the other substrate be in the range of 0 to 45°. The product ($\Delta n \cdot d$) of refractive anisotropy ($\Delta n$) and thickness (d) of the liquid crystal layer is preferably in the range of 0.1 to 1.0 $\mu$m, more preferably in the range of 0.3 to 0.8 $\mu$m. The substrate on which the liquid crystal molecules are vertically aligned may be on the transparent electrode side or on the opposite side.

The liquid crystal display of reflection type may be designed normally white mode (in which a bright or dark image is displayed when the applied voltage is low or high, respectively) or normally black mode (in which a dark or bright image is displayed when the applied voltage is low or high, respectively). The normally white mode is preferred.

EXAMPLE 1

(Preparation of Polymer Film)

At room temperature, 120 weight parts of cellulose acetate (average acetic acid content: 57.5%), 9.36 weight parts of triphenyl phosphate, 4.68 weight parts of biphenyl-diphenyl phosphate, 3.00 weight parts of the following retardation-increasing agent, 2.00 weight parts of tribenzyl amine, 543.14 weight parts of methylene chloride, 99.35 weight parts of methanol and 19.87 weight parts of n-butanol were mixed to prepare a dope.

Retardation-increasing Agent

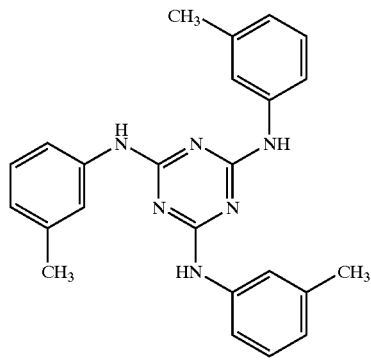

The prepared dope was cast onto a film-forming band, dried at room temperature for 1 minute, and further dried at 45° C. for 5 minutes. The thus-formed film contained the solvent remaining in the amount of 30 wt. %. After peeled from the band, the formed cellulose acetate film was further dried at 120° C. for 10 minutes. The film was then stretched at 130° C. parallel to the casting direction while it was let freely shrink perpendicularly. The stretched film was furthermore dried at 120° C. for 30 minutes, to prepare a cellulose acetate film in which the solvent remained in the amount of 0.1 wt. %.

The thus-prepared polymer film (PF-1) had the thickness of 54 μm, and its retardation values were measured at 450 nm, 550 nm and 590 nm by means of an ellipsometer (M-150, JASCO COORPORATION) to find 118.3 nm, 137.2 nm and 140.7 nm, respectively. The cellulose acetate film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.58.

(Preparation of Polarizing Plate)

A commercially available polarizing membrane (HLC2-5618HCS, Sunritz Corporation) was used. The membrane had the transmittance of 43.4% and the polarizing degree of 99.98%.

The above-prepared cellulose acetate film and the polarizing membrane were laminated so that the slow axis of the film might be oriented at the angle of 45° to the transmission axis of the membrane, to prepare a polarizing plate.

The optical characters of the plate were measured, and found that the ratios of T//(450)/T⊥(450) and T//(590)/T⊥(590) were 0.73 and 1.33, respectively. In the above, T// (450) and T⊥(450) are the transmittances in the directions parallel and perpendicular to the transmission axis, respectively, when incident light at 450 nm comes to the polarizing membrane side of the plate; and T//(590) and T⊥(590) are those when incident light at 590 nm comes. The polarizing plate gave almost completely circularly polarized light in a wide wavelength region (450 to 590 nm).

EXAMPLE 2

(Preparation of Polymer Film)

The dope prepared in Example 1 was cast on a band by means of a band-casting machine. When the solvent remaining in the formed film reached 15 wt. %, the film was peeled from the band and laterally stretched by 45% with a tenter at 150° C. to prepare a polymer film (PF-2, thickness: 40 μm).

With respect to the thus-prepared polymer film (PF-2), the retardation values were measured at 450 nm, 550 nm and 590 nm by means of an ellipsometer (M-150, JASCO COORPORATION) to find 118.3 nm, 137.2 nm and 140.7 nm, respectively. The cellulose acetate film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.70.

(Preparation of Polarizing Plate)

A commercially available polarizing membrane (HLC2-5618HCS, Sunritz Corporation) was used. The membrane had the transmittance of 43.4% and the polarizing degree of 99.98%.

The above-prepared cellulose acetate film and the polarizing membrane were laminated so that the slow axis of the film might be oriented at the angle of 45° to the transmission axis of the membrane, to prepare a polarizing plate.

The optical characters of the plate were measured, and found that the ratios of T//(450)/T⊥(450) and T//(590)/T⊥(590) were 0.73 and 1.33, respectively. In the above, T// (450) and T⊥(450) are the transmittances in the directions parallel and perpendicular to the transmission axis, respectively, when incident light at 450 nm comes to the polarizing membrane side of the plate; and T//(590) and T⊥(590) are those when incident light at 590 nm comes. The polarizing plate gave almost completely circularly polarized light in a wide wavelength region (450 to 590 nm).

EXAMPLE 3

(Preparation of Polymer Film)

At room temperature, 120 weight parts of cellulose acetate (average acetic acid content: 59.0%), 2.0 weight parts of the retardation-increasing agent used in Example 1, 9.36 weight parts of triphenyl phosphate, 4.68 weight parts of biphenyldiphenyl phosphate, 543.14 weight parts of methylene chloride, 99.35 weight parts of methanol and 19.87 weight parts of n-butanol were mixed to prepare a dope.

The prepared dope was cast onto a film-forming band, dried at room temperature for 1 minute, and further dried at 45° C. for 5 minutes. The thus-formed film contained the solvent remaining in the amount of 30 wt. %. After peeled from the band, the formed cellulose acetate film was further dried at 120° C. for 5 minutes. The film was then stretched at 130° C. in the direction oriented at 45° to the casting direction. The stretched film was furthermore dried at 130° C for 20 minutes, to prepare a cellulose acetate film in which the solvent remained in the amount of 0.1 wt. %.

The thus-prepared polymer film (PF-3) had the thickness of 97 μm, and its retardation values were measured at 450 nm, 550 nm and 590 nm by means of an ellipsometer (M-150, JASCO COORPORATION) to find 115.7 nm, 137.4 nm and 141.1 nm, respectively. The cellulose acetate film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.50.

(Preparation of Polarizing Plate)

A commercially available polarizing membrane (HLC2-5618HCS, Sunritz Corporation) was used. The membrane had the transmittance of 43.4% and the polarizing degree of 99.98%.

The above-prepared cellulose acetate film and the polarizing membrane were laminated so that the slow axis of the film might be oriented at the angle of 45° to the transmission axis of the membrane, to prepare a polarizing plate.

The optical characters of the plate were measured, and found that the ratios of T//(450)/T⊥(450) and T//(590)/T⊥(590) were 0.81 and 1.33, respectively. In the above, T//(450) and T⊥(450) are the transmittances in the directions parallel and perpendicular to the transmission axis, respectively, when incident light at 450 nm comes to the polarizing membrane side of the plate; and T//(590) and T⊥(590) are those when incident light at 590 nm comes. The polarizing plate gave almost completely circularly polarized light in a wide wavelength region (450 to 590 nm).

EXAMPLE 4

(Preparation of Polarizing Membrane)

Polyvinyl alcohol (PVA, average polymerization degree: 4,000, saponification degree: 99.8 mol. %) was dissolved in water, to prepare 40% PVA aqueous solution. The solution was cast onto a band, dried, peeled, and stretched parallel to the casting direction. While the tension was kept, the film was immersed at 30° C. for 1 minute in an aqueous solution containing 0.5 g/l of iodine and 50 g/l of potassium iodide. The film was then immersed at 70° C. for 5 minutes in another aqueous solution containing 100 g/l of boric acid and 60 g/l of potassium iodide, and washed in a water bath at 20° C. for 10 seconds. The washed film was dried at 80° C. for 5 minutes to prepare a polarizing membrane in the form of a roll. The width and the thickness of the membrane were 1,290 mm and 20 μm, respectively.

The prepared polarizing membrane had the transmittance of 43.7% and the polarizing degree of 99.97%.

(Preparation of Polarizing Plate)

The cellulose acetate film prepared in Example 3, the above-prepared polarizing membrane and a commercially available cellulose acetate film in the form of a roll (Fujitac TD80, Fuji Photo Film Co., Ltd.) were roll-to-roll laminated in this order, to prepare a polarizing plate.

The optical characters of the plate were measured, and found that the ratios of T//(450)/T⊥(450) and T//(590)/T⊥(590) were 0.81 and 1.33, respectively. In the above, T//(450) and T⊥(450) are the transmittances in the directions parallel and perpendicular to the transmission axis, respectively, when incident light at 450 nm comes to the polarizing membrane side of the plate; and T//(590) and T⊥(590) are those when incident light at 590 nm comes. The polarizing plate gave almost completely circularly polarized light in a wide wavelength region (450 to 590 nm).

EXAMPLE 5

(Preparation of TN-mode Liquid Crystal Display of reflection Type)

A glass substrate having an ITO electrode and another glass substrate equipped with an aluminum reflective electrode having a finely roughed surface were prepared. On the electrode of each glass substrate, a polyimide orientation layer (SE-7992, Nissan Chemical Industries Ltd.) was formed and subjected to rubbing treatment. The substrates were laminated so that the polyimide orientation layers might face to each other, and a spacer of 3.4 μm was inserted between the substrates. The substrates were placed so that the rubbing directions of the orientation layers might be crossed at the angle of 110°. To the gap between the substrates, a liquid crystal compound (MLC-6252, Merck) was injected to form a liquid crystal layer. Thus, a liquid crystal cell of TN mode (twisted angle: 70°, Δnd: 269 nm) was produced.

Independently, the procedure of Example 4 was repeated except that a protective film having AR-treated surface (an anti-glare anti-reflection film described in Japanese Patent Provisional Publication No. 2000-275404) was laminated on the polarizing membrane, to prepare a polarizing plate.

The polarizing plate was laminated on the glass substrate having the ITO electrode so that the cellulose acetate film of the plate might be in contact with the glass substrate. Thus, a liquid crystal display of reflection type was prepared.

To the thus-prepared display of reflection type, voltage of a square wave 1 kHz was applied. The display was then observed with eyes, and thereby it was confirmed that an image of neutral gray was given without undesirable coloring in either white mode (1.5 V) or black mode (4.5 V).

The contrast ratio of reflection brightness was measured by means of a meter (EZ-Contrast 160D, ELDIM), and thereby it was found that the front contrast ratio was 25 and that the viewing angle giving the contrast ratio of 3 was not less than 120° (up-downward) or not less than 120° (left-rightward). Further, the display was subjected to the durability test (temperature: 60° C., relative humidity: 90%) for 500 hours, but even so the displayed image had no defect.

EXAMPLE 6

(Preparation of STN-Mode Liquid Crystal Display of Reflection Type)

A glass substrate having an ITO transparent electrode and another glass substrate having a smooth aluminum reflective electrode were prepared. On the electrode of each glass substrate, a polyimide orientation layer (SE-150, Nissan Chemical Industries Ltd.) was formed and subjected to rubbing treatment. The substrates were laminated so that the polyimide orientation layers might face to each other, and a spacer of 6.0 μm was inserted between the substrates. The substrates were placed so that the rubbing directions of the orientation layers might be crossed at the angle of 60°. To the gap between the substrates, a liquid crystal compound (ZLI-2977, Merck) was injected to form a liquid crystal layer. Thus, a liquid crystal cell of STN mode (twisted angle: 240°, Δnd: 791 nm) was produced.

A commercially available internal diffusing sheet (IDS, Dai Nippon Printing Co., Ltd.) and the polarizing plate prepared in Example 4 were laminated in this order with an adhesive on the glass substrate having the ITO transparent electrode, so that the polarizing plate might be the top or bottom.

To the thus-prepared liquid crystal display of reflection type, voltage of a square wave 55 Hz was applied. The display was then observed with eyes, and thereby it was confirmed that an image of neutral gray was given without undesirable coloring in either white mode (2.5 V) or black mode (2.0 V).

The contrast ratio of reflection brightness was measured by means of a meter (EZ-Contrast 160D, ELDIM), and thereby it was found that the front contrast ratio was 8 and that the viewing angle giving the contrast ratio of 3 was 90° (up-downward) or 105° (left-rightward).

EXAMPLE 7
(Preparation of HAN-mode Liquid Crystal Display of Reflection Type)

A glass substrate having an ITO transparent electrode and another glass substrate having a smooth aluminum reflective electrode were prepared. On the ITO transparent electrode, a polyimide orientation layer (SE-610, Nissan Chemical Industries Ltd.) was formed and subjected to rubbing treatment. On the aluminum reflective electrode, a vertical orientation layer (SE-1211, Nissan Chemical Industries Ltd.) was formed and not subjected to rubbing treatment. The substrates were laminated so that the orientation layers might face to each other, and a spacer of 4.0 μm was inserted between the substrates. To the gap between the substrates, a liquid crystal compound (ZLI-1565, Merck) was injected to form a liquid crystal layer. Thus, a liquid crystal cell of HAN mode (Δnd: 519 nm) was produced.

The polarizing plate prepared in Example 4 was laminated with an adhesive on the glass substrate having the ITO transparent electrode, and further thereon a light-diffusing membrane (Lumisty, Sumitomo Chemical Co., Ltd.) was laminated.

To the thus-prepared liquid crystal display of reflection type, voltage of a square wave 55 Hz was applied. The display was then observed with eyes, and thereby it was confirmed that an image of neutral gray was given without undesirable coloring in either white mode (2.0 V) or black mode (0.8 V).

The contrast ratio of reflection brightness was measured by means of a meter (EZ-Contrast 160D, ELDIM), and thereby it was found that the front contrast ratio was 8 and that the viewing angle giving the contrast ratio of 3 was not less than 120° (up-downward) or not less than 120° (left-rightward).

Comparison Example 1
(Preparation of Polarizing Plate)

Polycarbonate (weight average molecular weight: 100,000) was dissolved in methylene chloride to prepare a 17 wt. % solution. The solution was cast on a glass plate to form a film (dry thickness: 80 μm), dried at room temperature for 30 minutes, and further dried at 70° C. for 30 minutes. The formed polycarbonate film (evaporated amount: about 1 wt. %) was peeled from the glass plate, and cut into pieces (size: 5 cm×10 cm). One of the pieces was uniaxially stretched at 158° C to prepare a stretched birefringencial polycarbonate film.

With respect to the thus-prepared polycarbonate film (λ/4 plate), the retardation values were measured at 450 nm, 550 nm and 590 nm by means of an ellipsometer (M-150, JASCO COORPORATION) to find 147.8 nm, 137.5 nm and 134.9 nm, respectively.

Further, the prepared polycarbonate film was laminated with an adhesive on a commercially available polarizing membrane (Sunritz Corporation) so that the slow axis of the film might be oriented at 45° to the transmission axis of the membrane, to prepare a polarizing plate.

The optical characters of the plate were measured, and found that the ratios of $T_{//}(450)/T_{\perp}(450)$ and $T_{//}(590)/T_{\perp}(590)$ were 0.33 and 1.18, respectively. In the above, $T_{//}(450)$ and $T_{\perp}(450)$ are the transmittances in the directions parallel and perpendicular to the transmission axis, respectively, when incident light at 450 nm comes to the polarizing membrane side of the plate; and $T_{//}(590)$ and $T_{\perp}(590)$ are those when incident light at 590 nm comes.

(Preparation of TN-mode Liquid Crystal Display of Reflection Type)

The above-prepared polarizing plate was laminated with an adhesive on the TN-mode liquid crystal cell prepared in Example 5, so that the polycarbonate film of the plate might be on the ITO electrode side and so that the slow axis of the λ/4 plate might be oriented at 45° to the transmission axis of the polarizing membrane.

To the thus-prepared liquid crystal display of reflection type, voltage of a square wave 1 kHz was applied. The display was then observed with eyes, and thereby it was confirmed that images slightly colored in bluish green and violet were given in white mode (1.5 V) and black mode (4.5 V), respectively.

The contrast ratio of reflection brightness was measured by means of a meter (EZ-Contrast 160D, ELDIM), and thereby it was found that the front contrast ratio was 10 and that the viewing angle giving the contrast ratio of 3 was not less than 100° (up-downward) or not less than 80° (left-rightward).

What is claimed is:

1. A polarizing plate which comprises a polymer film having a slow axis and a polarizing membrane having a transmission axis, said polymer film and said polarizing membrane being arranged to orient the slow axis of the polymer film essentially at an angle of 45° to the transmission axis of the polarizing membrane, wherein the polarizing membrane has a transmittance of 30 to 50% and a polarizing degree of 90 to 100%, wherein when light having a wavelength of 450 nm is incident on the polarizing membrane, the ratio of the transmittance in a direction parallel to the transmission axis to the transmittance in a direction perpendicular to the transmission axis satisfies the following formula (I), and wherein when light having a wavelength of 590 nm is incident on the polarizing membrane, the ratio of the transmittance in a direction parallel to the transmission axis to the transmittance in a direction perpendicular to the transmission axis satisfies the following formula (II):

$$0.6 \leq T_{//}(450)/T_{\perp}(450) \leq 1.5 \quad (I)$$

$$0.6 \leq T_{//}(590)/T_{\perp}(590) \leq 1.5 \quad (II)$$

in which $T_{//}(450)$ is the transmittance in the direction parallel to the transmission axis when light having a wavelength of 450 nm is incident on the polarizing membrane; $T_{\perp}(450)$ is the transmittance in the directions perpendicular to the transmission axis when light having a wavelength of 450 nm is incident on the polarizing membrane; $T_{//}(590)$ is the transmittance in the direction parallel to the transmission axis when light having a wavelength of 590 nm is incident on the polarizing membrane; $T_{\perp}(590)$ is the transmittance in the direction perpendicular to the transmission axis when light having a wavelength of 590 nm is incident on the polarizing membrane.

2. The polarizing plate as defined in claim 1, wherein the polymer film is a film stretched by 3 to 100%.

3. The polarizing plate as defined in claim 1, wherein the polymer film is made of cellulose acetate having an acetic acid content of 57.0 to 61.5%.

4. The polarizing plate as defined in claim 3, wherein the polymer film contains 100 weight parts of the cellulose acetate and 0.01 to 20 weight parts of an aromatic compound having at least two aromatic rings.

5. The polarizing plate as defined in claim 4, wherein the aromatic compound has at least one 1,3,5-triazine ring.

6. The polarizing plate as defined in claim 1, wherein the polymer film has an retardation value of Re(450) in the range of 100 to 125 nm, which is measured at a wavelength of 450 nm, and a retardation value of Re(590) in the range of 120 to 160 nm, which is measured at a wavelength of 590 nm, said Re(450) and Re(590) satisfying a condition of Re(590)−Re(450)≧2 nm.

7. The polarizing plate as defined in claim 6, wherein the polymer film has a retardation value of Re(450) in the range of 108 to 120 nm, which is measured at a wavelength of 450 nm, a retardation value of Re(550) in the range of 125 to 142 nm, which is measured at a wavelength of 550 nm and a retardation value of Re(590) in the range of 130 to 152 nm, which is measured at a wavelength of 590 nm, said Re(550) and Re(590) satisfying a condition of Re(590)−Re(550)≧2 nm.

8. The polarizing plate as defined in claim 1, wherein the polymer film has a refractive index of nx, which is measured along a direction parallel to the slow axis in the film plane, a refractive index of ny, which is measured along a direction perpendicular to the slow axis in the film plane, and a refractive index of nz, which is measured along a direction parallel to the thickness of the film, said nx, ny and ny satisfying a condition of 1≦ (nx−nz)/(nx−ny)≦2.

9. The polarizing plate as defined in claim 1, wherein the polymer film has a thickness in the range of 10 to 70 μm.

10. A liquid crystal display of reflection type comprising a liquid crystal cell, a polarizing plate provided on one side of the liquid crystal cell, and a reflection board, wherein the polarizing plate comprises a polymer film having a slow axis and a polarizing membrane having a transmission axis, said polymer film being arranged near the side of the liquid crystal cell, and said polymer film and said polarizing membrane being arranged to orient the slow axis of the polymer film essentially at an angle of 45° to the transmission axis of the polarizing membrane, wherein the polarizing membrane has a transmittance of 30 to 50% and a polarizing degree of 90 to 100%, wherein when light having a wavelength of 450 nm is incident on the polarizing membrane, the ratio of the transmittance in a direction parallel to the transmission axis to the transmittance in a direction perpendicular to the transmission axis satisfies the following formula (I), and wherein when light having a wavelength of 590 nm is incident on the polarizing membrane, the ratio of the transmittance in a direction parallel to the transmission axis to the transmittance in a direction perpendicular to the transmission axis satisfies the following formula (II):

$$0.6 \leq T_{//}(450)/T_{\perp}(450) \leq 1.5 \quad (I)$$

$$0.6 \leq T_{//}(590)/T_{\perp}(590) \leq 1.5 \quad (II)$$

in which $T_{//}(450)$ is the transmittance in the direction parallel to the transmission axis when light having a wavelength of 450 nm is incident on the polarizing membrane; $T_{\perp}(450)$ is the transmittance in the directions perpendicular to the transmission axis when light having a wavelength of 450 nm is incident on the polarizing membrane; $T_{//}(590)$ is the transmittance in the direction parallel to the transmission axis when light having a wavelength of 590 nm is incident on the polarizing membrane; $T_{\perp}(590)$ is the transmittance in the direction perpendicular to the transmission axis when light having a wavelength of 590 nm is incident on the polarizing membrane.

11. The liquid crystal display of reflection type as defined in claim 10, wherein the polymer film is a λ/4 plate, and the polarizing plate is a circularly polarizing plate.

* * * * *